(12) United States Patent
Yama et al.

(10) Patent No.: US 7,701,684 B2
(45) Date of Patent: Apr. 20, 2010

(54) POWER SUPPLY APPARATUS AND POWER SUPPLY SYSTEM INCLUDING THE SAME ADDRESSING ABNORMALITY

(75) Inventors: Michiaki Yama, Kyoto (JP); Takahiro Ota, Kyoto (JP); Eiji Nakagawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 96 days.

(21) Appl. No.: 11/960,016

(22) Filed: Dec. 19, 2007

(65) Prior Publication Data
US 2008/0151449 A1 Jun. 26, 2008

(30) Foreign Application Priority Data
Dec. 21, 2006 (JP) ............... 2006-343918

(51) Int. Cl.
*H02H 7/00* (2006.01)
(52) U.S. Cl. .......................... 361/78; 361/18
(58) Field of Classification Search ................... 361/18, 361/78, 79, 91.1, 111
See application file for complete search history.

(56) References Cited

U.S. PATENT DOCUMENTS 7,330,990 B2 * 2/2008 Sato et al. ................... 713/340
7,449,797 B2 * 11/2008 Takahashi .................... 307/52
2007/0260918 A1 * 11/2007 Okada et al. ................. 714/14

FOREIGN PATENT DOCUMENTS

JP 2004-227555 8/2004

* cited by examiner

*Primary Examiner*—Danny Nguyen
(74) *Attorney, Agent, or Firm*—Fish & Richardson P.C.

(57) ABSTRACT

A power supply apparatus connected via a bus line to another power supply apparatus includes a voltage generation circuit generating a voltage, an abnormality detection circuit detecting an abnormality of the power supply apparatus including the abnormality detection circuit and outputting an abnormality detection signal, an abnormality control circuit, and an interface circuit receiving the abnormality detection signal from the abnormality detection circuit to output the signal via the bus line to another power supply apparatus, and receiving the abnormality detection signal via the bus line from another power supply apparatus to output the signal, to the abnormality control circuit and the abnormality control circuit controlling the voltage generation circuit to stop generation of the voltage in a case where receiving the abnormality detection signal from the abnormality detection circuit or in a case where receiving the abnormality detection signal from the interface circuit.

3 Claims, 4 Drawing Sheets

POWER SUPPLY APPARATUS AND POWER SUPPLY SYSTEM INCLUDING THE SAME ADDRESSING ABNORMALITY

BACKGROUND OF THE INVENTION

1. Field of the Invention

The present invention relates to a power supply apparatus and a power supply system, and particularly to a power supply apparatus and a power supply system that address an output abnormality or the like of the power supply apparatus.

2. Description of the Background Art

A power supply system detecting an output abnormality of a power supply apparatus and managing the power supply apparatus has been developed. For example, Japanese Patent Laying-Open No. 2004-227555 (Patent Document 1) discloses a power supply management and control apparatus for a power supply device as described below. This apparatus manages and controls electric current supplied to a plurality of loads in a load system of the power supply device. The apparatus includes a switch device including a plurality of current paths and supplying an output voltage supplied from the power supply device through different current paths to different loads respectively, a microcontroller controlling an open/close status of the switch device, a set reference value storage unit linked to the microcontroller and storing a rated total output current value of the power supply device as set in advance, and a priority sequence storage unit linked to the microcontroller and storing the number of loads in the whole system and an operational item of a sequence of priority of shutting down the loads as determined in advance. When the microcontroller detects that the actual total output current exceeds the rated total output current value as set of the power supply device, current supply to at least one load is shut down according to the sequence of priority of shutting the loads. When the actual total output current is smaller than the rated total output current value, loads for which the current supply is previously shut down are restarted according to the opposite sequence of priority of shutting down the loads.

However, the power supply management and control apparatus for the power supply device disclosed in Patent Document 1 monitors the output current of the power supply device by the microcontroller to control the power supply device, and thus the line connecting the microcontroller and the power supply device is complicated. Further, it is necessary that the microcontroller includes a terminal for receiving the output current of the power supply device and a circuit for measuring the output current value. Therefore, the power management and control apparatus for the power supply device disclosed in Patent Document 1 has a problem of the complicated circuit configuration.

SUMMARY OF THE INVENTION

An object of the present invention is to provide a power supply apparatus and a power supply system that can address an abnormality of the power supply apparatus and that can have a simplified circuit configuration.

A power supply apparatus according to an aspect of the present invention is connected via a bus line to another power supply apparatus, and includes: a voltage generation circuit generating a voltage; an abnormality detection circuit detecting an abnormality of the power supply apparatus including the abnormality detection circuit and outputting an abnormality detection signal; an abnormality control circuit; and an interface circuit receiving the abnormality detection signal from the abnormality detection circuit and outputting the abnormality detection signal to the another power supply apparatus via the bus line, and receiving an abnormality detection signal from the another power supply apparatus via the bus line and outputting the abnormality detection signal to the abnormality control circuit. The abnormality control circuit controls the voltage generation circuit to stop generation of the voltage in a case where the abnormality control circuit receives the abnormality detection signal from the abnormality detection circuit or in a case where the abnormality control circuit receives the abnormality detection signal from the interface circuit.

A power supply system according to an aspect of the present invention includes: a plurality of power supply apparatuses and a bus line connecting the plurality of power supply apparatuses to each other. The power supply apparatuses each include: a voltage generation circuit generating a voltage; an abnormality detection circuit detecting an abnormality of the power supply apparatus including the abnormality detection circuit and outputting an abnormality detection signal; an abnormality control circuit; and an interface circuit receiving the abnormality detection signal from the abnormality detection circuit and outputting the abnormality detection signal to another power supply apparatus via the bus line, and receiving an abnormality detection signal from the another power supply apparatus via the bus line and outputting the abnormality detection signal to the abnormality control circuit. The abnormality control circuit controls the voltage generation circuit to stop generation of the voltage in a case where the abnormality control circuit receives the abnormality detection signal from the abnormality detection circuit or in a case where the abnormality control circuit receives the abnormality detection signal from the interface circuit.

Preferably, the power supply system further includes a primary power supply apparatus supplying a primary voltage to a plurality of power supply apparatuses and a microcomputer connected to the bus line. The voltage generation circuit generates a secondary voltage based on the primary voltage supplied from the primary power supply apparatus. The interface circuit further outputs the abnormality detection signal received from the abnormality detection circuit to the microcomputer via the bus line. In a case where the microcomputer receives the abnormality detection signal from the interface circuit, the microcomputer controls the primary power supply apparatus to stop generation of the primary voltage.

Preferably, the power supply system further includes a primary power supply apparatus supplying a primary voltage to a plurality of power supply apparatuses and connected to the bus line. The voltage generation circuit generates a secondary voltage based on the primary voltage supplied from the primary power supply apparatus. The interface circuit further outputs the abnormality detection signal received from the abnormality detection circuit to the primary power supply apparatus via the bus line. In a case where the primary power supply apparatus receives the abnormality detection signal from the interface circuit, the primary power supply apparatus stops generating the primary voltage.

In accordance with the present invention, an abnormality of the power supply apparatus can be addressed and the circuit configuration can be simplified.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
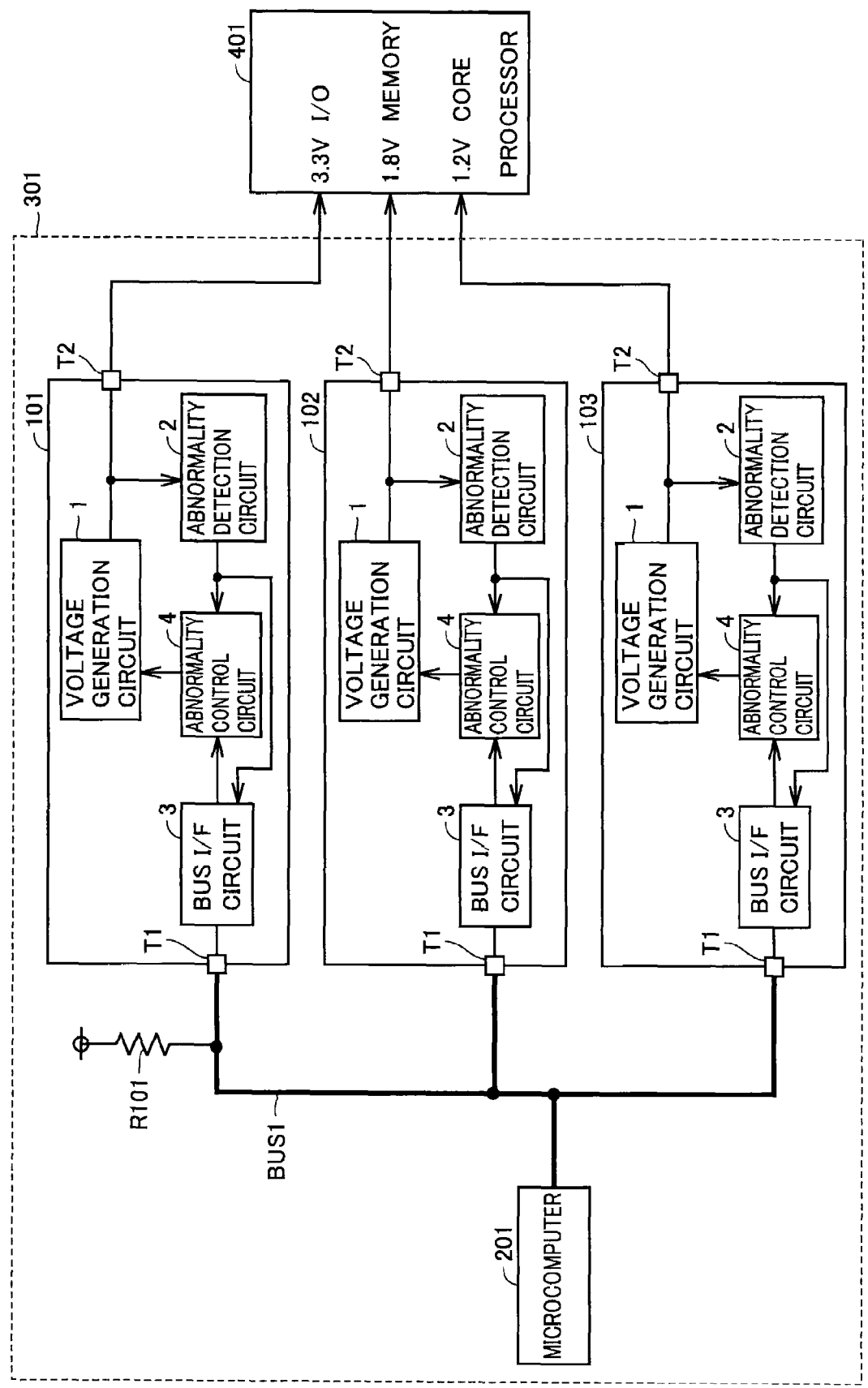
FIG. 1 shows a configuration of a power supply system according to a first embodiment of the present invention.

In the following, embodiments of the present invention will be described with reference to the drawings. Like or corresponding components in the drawings are denoted by like reference characters and a description thereof will not be repeated.

First Embodiment

[Configuration and Basic Operation]

FIG. 1 shows a configuration of a power supply system according to a first embodiment of the present invention.

Referring to FIG. 1, power supply system 301 includes power supply apparatuses 101-103, a microcomputer 201, a bus line BUS1 and a resistor R101. Power supply apparatus 101 includes a voltage generation circuit 1, an abnormality detection circuit 2, a bus interface (I/F) circuit 3, an abnormality control circuit 4 and external terminals T1 and T2.

Power supply apparatuses 101-103 generate respective voltages different from each other and supply respective voltages via external terminals T2 to a processor 401. For example, power supply apparatus 101 supplies a voltage of 3.3 V to processor 401 for use as power to be supplied to an external input/output buffer. Power supply apparatus 102 supplies a voltage of 1.8 V to processor 401 for use as power to be supplied to a memory. Power supply apparatus 103 supplies a voltage of 1.2 V to processor 401 for use as power to be supplied to a core.

Bus line BUS1 connects power supply apparatuses 101-103 and microcomputer 201 to each other. Resistor R101 is a pull-up resistor and has one end connected to a fixed voltage and the other end connected to bus line BUS1.

In power supply apparatus 101, voltage generation circuit 1 is a switching regulator or series regulator for example. Voltage generation circuit 1 generates a DC voltage and supplies the generated DC voltage via external terminal T2 to processor 401.

Abnormality detection circuit 2 monitors the output voltage of voltage generation circuit 1 for example to detect an abnormality of its power supply apparatus, specifically an abnormality such as increase of the output, decrease of the output, abnormal start and overcurrent. In the case where abnormality detection circuit 2 detects an abnormality of the power supply apparatus including abnormality detection circuit 2, abnormality detection circuit 2 outputs an abnormality detection signal to bus interface circuit 3 and abnormality control circuit 4.

Bus interface circuit 3 outputs the abnormality detection signal received from abnormality detection circuit 2 to another power supply apparatus via bus line BUS1. Further, bus interface circuit 3 receives via bus line BUS1 an abnormality detection signal from another power supply apparatus and outputs the abnormality detection signal to abnormality control circuit 4.

In the case where abnormality control circuit 4 receives the abnormality detection signal from abnormality detection circuit 2 or in the case where abnormality control circuit 4 receives the abnormality detection signal from another power supply apparatus via bus interface circuit 3, abnormality control circuit 4 outputs a voltage stop control signal to voltage generation circuit 1.

Voltage generation circuit 1 receives the voltage stop control signal from abnormality control circuit 4 to stop generating the DC voltage.

The configuration and operation of power supply apparatuses 102 and 103 are similar to those of power supply apparatus 101 and thus the detailed description thereof will not be repeated here.

Figure 2:
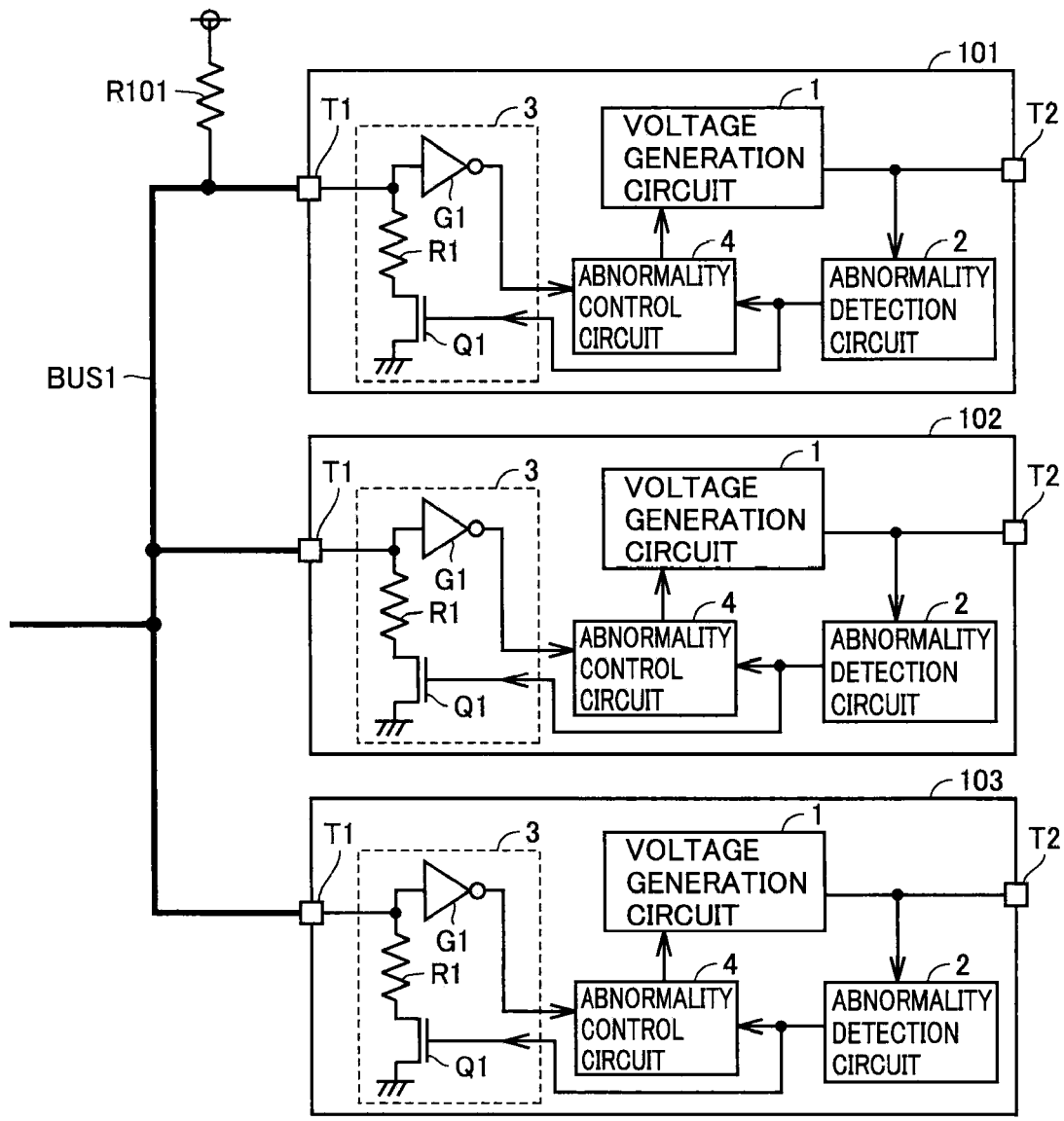
FIG. 2 shows a detailed configuration of a bus interface circuit 3 of a power supply apparatus according to the first embodiment of the present invention.

FIG. 2 shows a detailed configuration of bus interface circuit 3 of the power supply apparatus in the first embodiment of the present invention.

Referring to FIG. 2, bus interface circuit 3 includes an N-channel MOS transistor Q1, a resistor R1 and an inverter circuit G1.

N-channel MOS transistor Q1 has its drain connected to a first end of resistor R1, its source connected to a ground potential and its gate connected to an output of abnormality detection circuit 2. A second end of resistor R1 is connected to an input of inverter circuit G1 and to bus line BUS1 via external terminal T1.

In a normal state, the potential of bus line BUS1 is set to H level by pull-up resistor R101. At this time, since the input level of inverter circuit G1 of power supply apparatuses 101-103 is H level, the output of inverter circuit G1 is L level so that the abnormality detection signal is not output from bus interface circuit 3 to abnormality control circuit 4.

A description will be given of operation of power supply system 301 in the case where an abnormality occurs in power supply apparatus 101.

In power supply system 301, if an abnormality is detected in any of power supply apparatuses 101-103, the potential of bus line BUS1 is L level. More specifically, in power supply apparatus 101 in which an abnormality occurs, abnormality detection circuit 2 detecting the abnormality of the power supply apparatus including abnormality detection circuit 2 outputs a signal of H level as an abnormality detection signal to the gate of N-channel MOS transistor Q1 and to abnormality control circuit 4. Then, N-channel MOS transistor Q1 is turned on and the potential of bus line BUS1 becomes the ground potential. Namely, a signal of L level is output from power supply apparatus 101 in which the abnormality occurs to other power supply apparatuses 102 and 103 via bus line BUS1. Further, abnormality control circuit 4 receiving the abnormality detection signal from abnormality detection circuit 2 controls voltage generation circuit 1 to stop generation of the voltage.

Then, in power supply apparatuses 102 and 103, inverter circuit G1 having the input level of L level outputs a signal of H level, namely an abnormality detection signal, to abnormality control circuit 4. Abnormality control circuit 4 receiving the abnormality detection signal from inverter circuit G1 controls voltage generation circuit 1 to stop generation of the voltage.

Regarding Patent Document 1, the power supply management and control apparatus for the power supply device as disclosed therein monitors the output current of the power supply device by means of the microcontroller for controlling the power supply device, and thus has the problem that the circuit configuration is complicated. In contrast, regarding the power supply apparatus in the first embodiment of the invention, abnormality detection circuit 2 detects an abnormality of the power supply apparatus including abnormality detection circuit 2 to output an abnormality detection signal. Bus interface circuit 3 outputs the abnormality detection signal received from abnormality detection circuit 2 to other power supply apparatuses via bus line BUS1, and receives an abnormality detection signal from another power supply apparatus via bus line BUS1 to output the abnormality detection signal to abnormality control circuit 4. Abnormality control circuit 4 controls voltage generation circuit 1 to stop generation of the voltage in the case where abnormality control circuit 4 receives the abnormality detection signal from abnormality detection circuit 2 or receives the abnormality detection signal from bus interface circuit 3. Since the above-described configuration is provided, it is unnecessary that microcomputer 201 has a terminal for receiving an output of the power supply apparatus as well as a circuit for measuring the output. Further, since a line for monitoring the output of the power supply apparatus by the microcontroller to control the power supply apparatus is unnecessary, the line between microcomputer 201 and the power supply apparatus can be simplified. Moreover, on the substrate on which power supply system 301 is mounted, even if power supply apparatuses 101-103 are disposed on different sites on the substrate according to the use of the power supply apparatuses such as power supply for digital components, power supply for analog components and power supply for high power consuming components, the number of lines on the substrate may be small. Thus, the power supply system in the first embodiment of the invention can address an abnormality of the power supply apparatus and have the simplified circuit configuration.

While it is described above that the power supply system in the first embodiment of the invention is configured such that microcomputer 201 is connected to bus line BUS1, the power supply system is not limited to this. Any configuration in which microcomputer 201 is not connected to bus line BUS1 can address an abnormality of the power supply apparatus and thus the circuit configuration can be further simplified.

Figure 3:
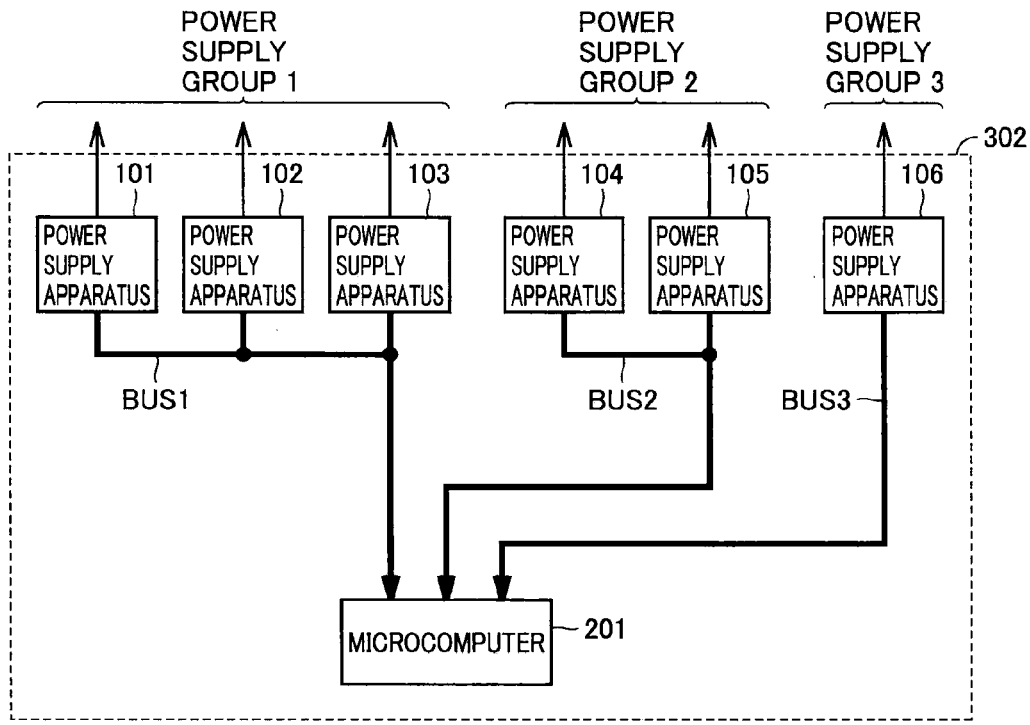
FIG. 3 schematically shows a configuration of a modification of the power supply system according to the first embodiment of the present invention.

FIG. 3 schematically shows a configuration of a modification of the power supply system in the first embodiment of the invention.

Referring to FIG. 3, power supply system 302 includes power supply apparatuses 101-106, a microcomputer 201 and bus lines BUS1-BUS3.

A power supply group 1 is configured of power supply apparatuses 101-103. A power supply group 2 is configured of power supply apparatuses 104 and 105. A power supply group 3 is configured of a power supply apparatus 106.

Bus line BUS1 connects power supply apparatuses 101-103 and microcomputer 201 to each other. Bus line BUS2 connects power supply apparatuses 104, 105 and microcomputer 201 to each other. Bus line BUS3 connects power supply apparatus 106 and microcomputer 201 to each other.

In the above-described configuration, a power supply group to be protected centrally and a power supply group to be protected individually can be separately protected by merely changing the connection of bus lines. Thus, with the simple configuration, the flexibility of the power supply system can be enhanced.

Next, another embodiment of the present invention will be described with reference to the drawings. In the drawings, like or corresponding components are denoted by like reference characters and the description thereof will not be repeated.

Second Embodiment

The present embodiment relates to a power supply system having an increased bit width of the bus line as compared with the power supply system in the first embodiment.

Figure 4:
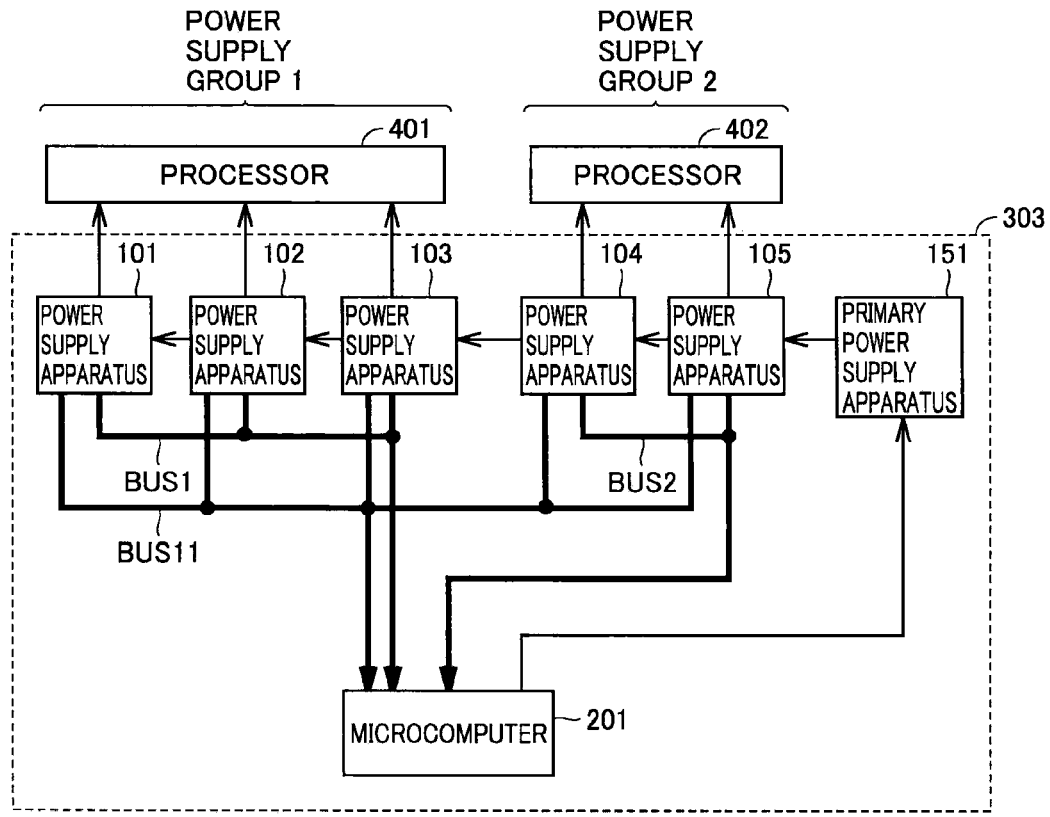
FIG. 4 shows a configuration of a power supply system according to a second embodiment of the present invention.

FIG. 4 shows a configuration of the power supply system according to a second embodiment of the present invention.

Referring to FIG. 4, power supply system 303 includes power supply apparatuses 101-105, a primary power supply apparatus 151, a microcomputer 201, bus lines BUS1 and BUS2 and a bus line BUS11.

Primary power supply apparatus 151 supplies a primary voltage to power supply apparatuses 101-105. Based on the primary voltage supplied from primary power supply apparatus 151, power supply apparatuses 101-103 generate respective voltages different from each other as secondary voltages to supply the generated secondary voltages to a processor 401. Based on the primary voltage supplied from primary power supply apparatus 151, power supply apparatuses 104 and 105 generate respective voltages different from each other as secondary voltages to supply the generated secondary voltages to a processor 402. More specifically, voltage generation circuits 1 of power supply apparatuses 101-105 generate DC voltages based on the primary voltage supplied from primary power supply apparatus 151 and supply the voltages via external terminals T2 to processors 401 and 402.

Bus line BUS1 connects power supply apparatuses 101-103 and microcomputer 201 to each other. Bus line BUS2 connects power supply apparatuses 104 and 105 and microcomputer 201 to each other. Bus line BUS11 connects power supply apparatuses 101-105 and microcomputer 201 to each other.

The bus lines of power supply system 303 have a 2-bit configuration. Namely, bus lines BUS1 and BUS2 correspond to the first bit and bus line BUS11 corresponds to the second bit.

Here, a description will be given of operation of power supply system 303 in the case where an abnormality occurs in power supply apparatus 101.

In the case where power supply apparatus 101 detects a serious abnormality influencing the whole system, such as short-circuit between the input terminal used for receiving the primary voltage from primary power supply apparatus 151 and the output terminal used for outputting the secondary voltage to processor 401, power supply apparatus 101 outputs an abnormality detection signal via bus line BUS11 to other power supply apparatuses 102-105 and microcomputer 201.

In the case where microcomputer 201 receives the abnormality detection signal via bus line BUS11, microcomputer 201 controls primary power supply apparatus 151 to stop supply of the primary voltage. When the supply of the primary voltage is stopped, power supply apparatuses 101-105 stop supplying the secondary voltages.

In contrast, in the case where power supply apparatus 101 detects a nonserious abnormality such as a decrease of the output, power supply apparatus 101 outputs an abnormality detection signal via bus line BUS1 to other power supply apparatuses 102 and 103 in the same power supply group 1 to which power supply apparatus 101 belongs and to microcomputer 201.

Power supply apparatuses 102 and 103 receiving the abnormality detection signal via bus line BUS1 from power supply apparatus 101 stop supplying the secondary voltages.

Other components and operational details are similar to those of the power supply system in the first embodiment of the invention. Therefore, the power supply system in the second embodiment of the invention can address an abnormality of the power supply apparatus and have a simplified circuit configuration like the power supply system in the first embodiment of the invention. Further, the power supply system in the second embodiment of the invention has the bus lines of multiple bits and thus can appropriately address different abnormalities of the power supply apparatus.

A still another embodiment of the present invention will be described with reference to the drawings. In the drawings, like or corresponding components are denoted by like reference characters and the description thereof will not be repeated.

Third Embodiment

The present embodiment relates to a power supply system configured without a microcomputer as compared with the power supply system in the second embodiment.

Figure 5:
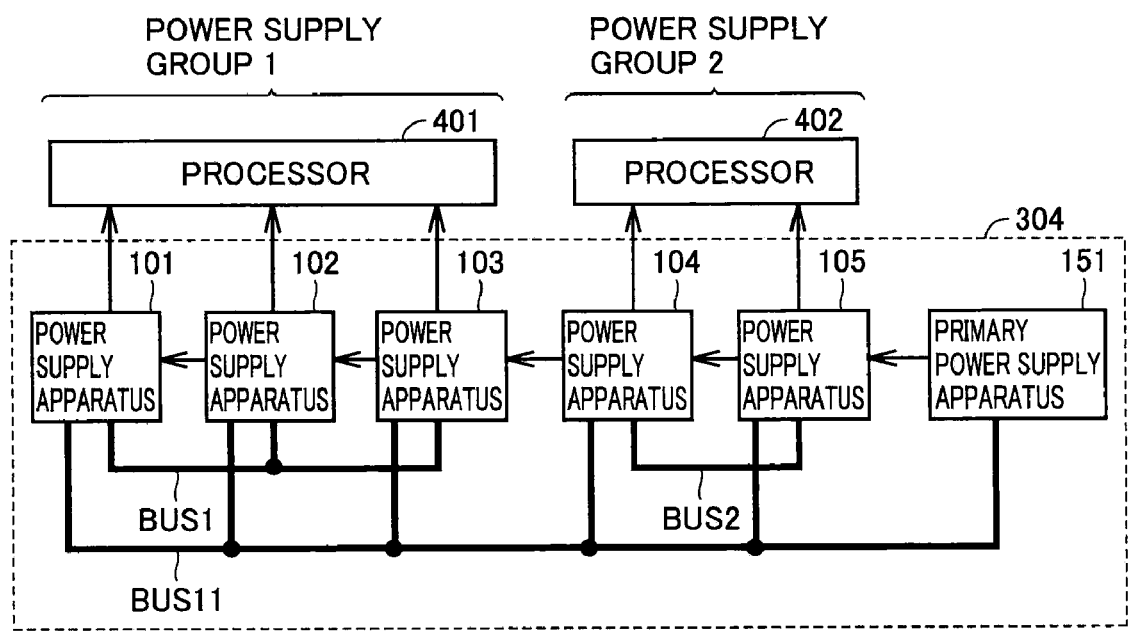
FIG. 5 shows a configuration of a power supply system according to a third embodiment of the present invention.

FIG. 5 shows a configuration of the power supply system in a third embodiment of the present invention.

Referring to FIG. 5, power supply system 304 includes power supply apparatuses 101-105, a primary power supply apparatus 151, bus lines BUS1 and BUS2 and a bus line BUS11.

Bus line BUS1 connects power supply apparatuses 101-103 to each other. Bus line BUS2 connects power supply apparatuses 104 and 105 to each other. Bus line BUS11 connects power supply apparatuses 101-105 and primary power supply apparatus 151 to each other.

The bus lines of power supply system 304 have a 2-bit configuration. Namely, bus lines BUS1 and BUS2 correspond to the first bit and bus line BUS11 corresponds to the second bit.

Here, operation will be described of power supply system 304 in the case where an abnormality occurs in power supply apparatus 101.

In the case where power supply apparatus 101 detects a serious abnormality influencing the whole system such as short-circuit between the input terminal used for receiving the primary voltage from primary power supply circuit 151 and the output terminal for outputting the secondary voltage to processor 401, power supply apparatus 101 outputs an abnormality detection signal via bus line BUS11 to other power supply apparatuses 102-105 and primary power supply apparatus 151.

In the case where primary power supply apparatus 151 receives the abnormality detection signal via bus line BUS11, primary power supply apparatus 151 stops supplying the primary voltage. When the supply of the primary voltage is stopped, power supply apparatuses 101-105 stop supplying the secondary voltages.

In the case where power supply apparatus 101 detects a nonserious abnormality such as a decrease of the output, power supply apparatus 101 outputs an abnormality detection signal via bus line BUS1 to other power supply apparatuses 102 and 103 in the same power supply group 1 to which power supply apparatus 101 belongs.

Receiving the abnormality detection signal from power supply apparatus 101 via bus line BUS1, power supply apparatuses 102 and 103 stop supplying the secondary voltages.

Other components and operational details are similar to those of the power supply system in the second embodiment of the invention. Therefore, the power supply system in the third embodiment of the invention can address an abnormality of the power supply apparatus and have a simplified circuit configuration like the power supply system in the second embodiment of the invention. Further, the power supply system in the third embodiment of the invention can appropriately address different abnormalities of the power supply apparatus with a simpler configuration without using a microcomputer as compared with the power supply system in the second embodiment of the invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power supply system comprising:
a plurality of power supply apparatuses; and
a bus line connecting said plurality of power supply apparatuses to each other,
said power supply apparatuses each including:
a voltage generation circuit generating a voltage;
an abnormality detection circuit detecting an abnormality of the power supply apparatus including said abnormality detection circuit and outputting an abnormality detection signal;
an abnormality control circuit; and
an interface circuit receiving the abnormality detection signal from said abnormality detection circuit and outputting the abnormality detection signal to another power supply apparatus via said bus line, and receiving an abnormality detection signal from said another power supply apparatus via said bus line and outputting the abnormality detection signal to said abnormality control circuit, wherein
said abnormality control circuit controls said voltage generation circuit to stop generation of the voltage in a case where the abnormality control circuit receives the abnormality detection signal from the abnormality detection circuit or in a case where the abnormality control circuit receives the abnormality detection signal from said interface circuit.

2. The power supply system according to claim 1, further comprising:
a primary power supply apparatus supplying a primary voltage to said plurality of power supply apparatuses; and
a microcomputer connected to said bus line, wherein
said voltage generation circuit generates a secondary voltage based on the primary voltage supplied from said primary power supply apparatus,
said interface circuit further outputs the abnormality detection signal received from said abnormality detection circuit to said microcomputer via said bus line, and
in a case where said microcomputer receives the abnormality detection signal from said interface circuit, said microcomputer controls said primary power supply apparatus to stop generation of said primary voltage.

3. The power supply system according to claim 1, further comprising a primary power supply apparatus supplying a primary voltage to said plurality of power supply apparatuses and connected to said bus line, wherein said voltage generation circuit generates a secondary voltage based on the primary voltage supplied from said primary power supply apparatus, said interface circuit further outputs the abnormality detection signal received from said abnormality detection circuit to said primary power supply apparatus via said bus line, and in a case where said primary power supply apparatus receives the abnormality detection signal from said interface circuit, said primary power supply apparatus stops generating said primary voltage.

* * * * *